United States Patent [19]

Baker

[11] Patent Number: 4,612,690
[45] Date of Patent: Sep. 23, 1986

[54] MULTIPLE SPINDLE MACHINE TOOL
[75] Inventor: Gary L. Baker, Portland, Mich.
[73] Assignee: Crankshaft Machine Company, Jackson, Mich.
[21] Appl. No.: 685,483
[22] Filed: Dec. 24, 1984
[51] Int. Cl.[4] .............................................. B23Q 7/00
[52] U.S. Cl. .................................... 29/33 P; 29/563; 29/564; 82/2.5
[58] Field of Search ...................... 29/564, 563, 564.7, 29/565, 27 R, 27 C, 33 P, 51; 82/DIG. 5, 2.5, 3, 2.7

[56] References Cited

U.S. PATENT DOCUMENTS

| 2,745,167 | 5/1956 | Cross .................................... 29/33 P |
| 2,803,840 | 8/1957 | McShirley ........................ 29/33 P X |
| 3,113,404 | 12/1963 | Narel et al. ......................... 29/563 X |
| 3,821,835 | 7/1974 | St. Andre et al. ................. 82/2.5 X |
| 3,946,484 | 3/1976 | Aronstein et al. ................ 29/563 X |
| 3,952,388 | 4/1976 | Hasegawa et al. ............... 29/563 X |
| 4,035,904 | 7/1977 | Ishizaka et al. .................. 29/564 X |
| 4,097,984 | 7/1978 | Petrov ................................. 29/563 |
| 4,563,925 | 1/1986 | Link .................................. 82/2.7 X |

FOREIGN PATENT DOCUMENTS

| 1171554 | 1/1959 | France ................................. 29/33 P |
| 100581 | 8/1979 | Japan .................................. 29/563 |
| 403509 | 3/1974 | U.S.S.R. ............................. 29/563 |
| 715291 | 2/1980 | U.S.S.R. ............................. 29/563 |
| 738773 | 6/1980 | U.S.S.R. ............................. 29/27 C |

Primary Examiner—William R. Briggs
Attorney, Agent, or Firm—Beaman & Beaman

[57] ABSTRACT

The invention pertains to a multiple spindle machine tool wherein a plurality of substantially parallel spindles transversely disposed to a workpiece transfer path permit sequential operations upon a workpiece transferred from spindle to spindle. Spindles may be mounted upon opposite sides of the transfer path permitting machining on opposite sides of a workpiece, and the machine tool permits successive operations to be performed sequentially, rapidly and economically.

9 Claims, 4 Drawing Figures

4,612,690

MULTIPLE SPINDLE MACHINE TOOL

BACKGROUND OF THE INVENTION

Machine tools utilizing a rotating workpiece or a rotating spindle are often capable of permitting sequential tool operation on the workpiece. For instance, where the workpiece is rotating such as in lathes, turret lathes and chucking machines, a variety of tools such as boring tools, centers, drills and reamers may be mounted upon an indexable tool holder, such as a turret, for sequential engagement with the workpiece. In this manner a plurality of machining operations may be accomplished without tranfer of the workpiece to another station or rotating chuck or spindle, but the nature of the machining operations are limited.

Machine tools utilizing rotating tools such as drills and boring bits, may be mounted upon rotatable spindles of the axially translatable type. Such tools normally require that the workpiece be retrieved from a supply, chucked into the workpiece holder, machined by the tools, unchucked, and placed in a bulk container for transfer to the next machine tool. Such extensive multiple handling of the workpiece is expensive and time consuming, and makes it difficult to insure high accuracy and quality.

Conventional machine tools do not permit the ready machining of opposite sides of a workpiece. For instance, workpieces such as hubs, blanks and gears often require turning and drilling operations on opposite sides thereof, and such operations require that the workpiece be chucked, machined, unchucked and then transported to another machine wherein the workpiece opposite side is chucked permitting machining of the side not previously accessible. The operations on opposite sides of the part have required two separate machines and two chuckings.

It is an object of the invention to provide a machine tool of the automated type wherein the workpiece is sequentially transferred from one work station to another, each station utilizing a linearly displaceable rotating work-holding spindle wherein sequential operations may be automatically achieved upon a common workpiece.

Another object of the invention is to provide a machine tool having a base and a transfer region defined thereon wherein workpieces are sequentially transferred between adjacent aligned rotating spindles permitting sequential secondary operations to be automatically performed on the workpiece.

A further object of the invention is to provide a machine tool of the multiple spindle type wherein the base of the machine tool includes a central region and lateral sides disposed on opposite sides of the transfer central region. Tools located on opposite sides of the central region permit the workpiece to be automatically sequentially machined on opposite sides thereby minimizing handling and material flow problems.

In the practice of the invention, a machine tool includes a heavy base having a central region and lateral sides located on opposite sides of the central region. In most cases, the base will be of an elongated configuration, and preferably, the base includes a plurality of laterally extending portions having a length perpendicularly disposed to the length of the central region.

A plurality of work-holding spindles are mounted upon the base lateral sides, a single spindle usually being located upon each lateral portion, and preferably, spindles are located upon each base lateral side with respect to the central region. The spindles consist of elongated tubular heads mounted to be displaceable in their longitudinal direction, and each head usually includes a rotating work-holding spindle powered by an electric motor. However, non-rotating spindles may also be used at selected locations. Longitudinal displacement of the spindles is provided by a linear actuator, such as a threaded shaft or rod rotated by an electric motor. Work-holding means are mounted upon one end of the spindle, while torque transmitting means are defined upon the other spindle end in operative engagement with the spindle drive motor.

The heads move in a direction substantially perpendicular to the length of the machine tool base central region, and work transfer apparatus is mounted upon the base central region for sequentially transferring workpieces between adjacent spindles. Preferably, the transfer means includes a plurality of work-holding blocks reciprocal between alignment with adjacent spindles in the direction of the central region length.

As the spindles are mounted upon opposite sides of the workpiece transfer apparatus, the workpieces may be machined upon opposite sides by tools located adjacent the spindles as they are transferred between adjacent spindles, and the workpiece is sequentially transferred along the length of the machine tool central region to complete the desired operations.

The work transfer apparatus includes an elongated beam suspended above the base central region, and the workpiece blocks suspend below this beam whereby the blocks may be readily aligned with the spindles. Reciprocal motor means, such as of the hydraulic or screw actuator type, are used to reciprocate the beam and workpiece holders.

The apparatus of the invention permits a series of machining operations to be produced on a workpiece, the operation of the machine tool is fully automated, and the concise configuration of the machine tool and the rapid sequential machining operations permits relatively complex machining to be rapidly produced.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
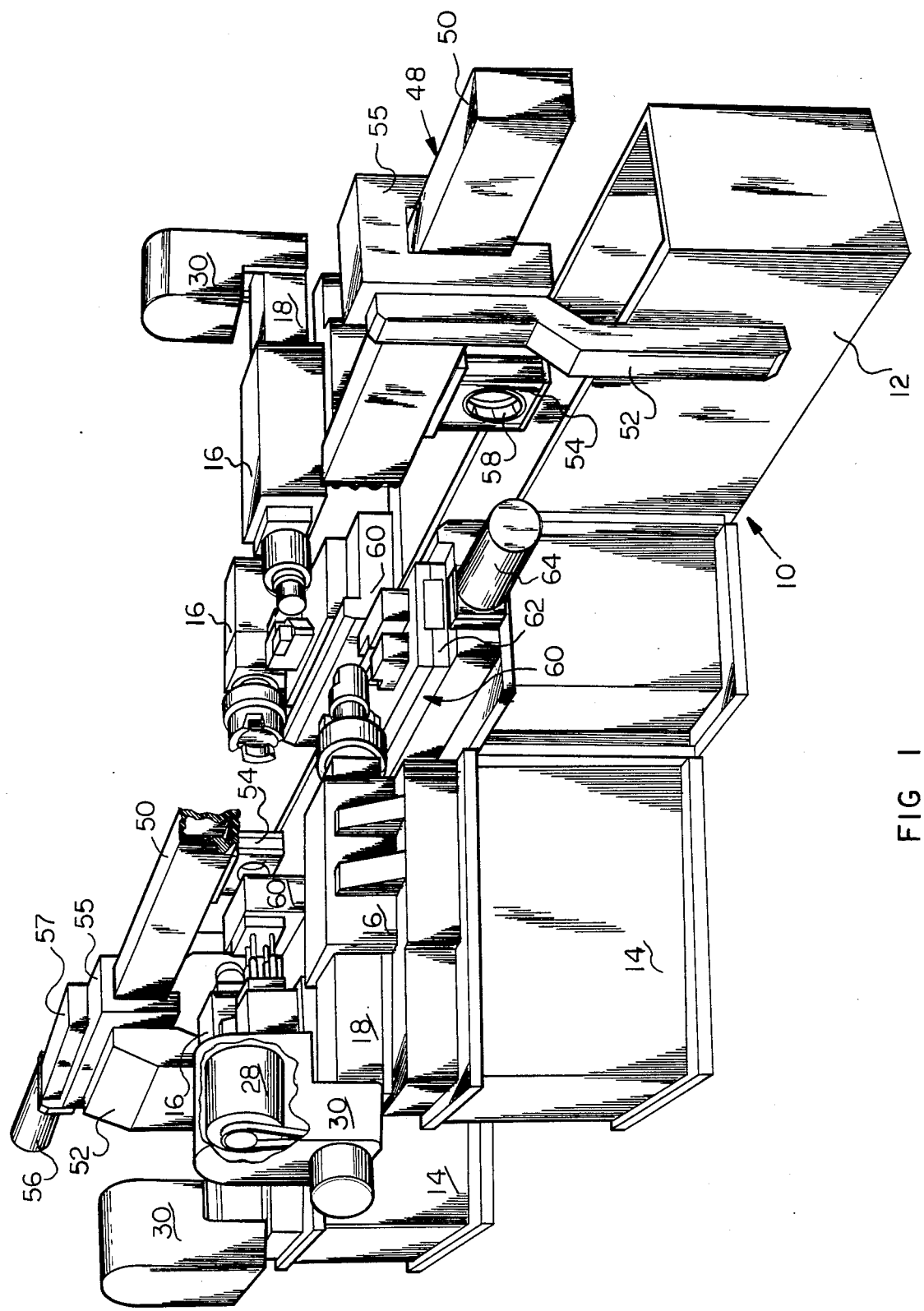
FIG. 1 is a perspective view of a machine tool in accord with the invention.
Figure 2:
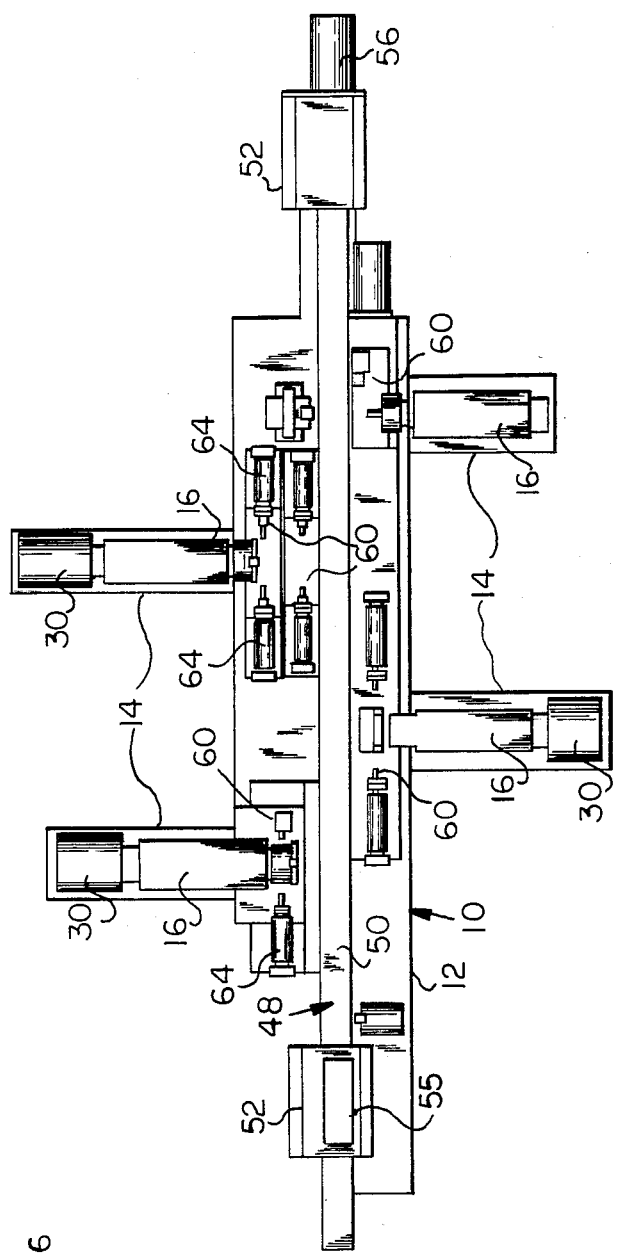
FIG. 2 is a plan view of the machine tool of FIG. 1.

The overall arrangement of a machine tool in accord with the concept of the invention will be appreciated from FIGS. 1 and 2. The machine tool includes a base frame generally indicated at 10 which is of an elongated configuration as appreciated from FIG. 2, and includes a central region portion 12 of a rectangular configuration and lateral portions 14 are disposed upon opposite sides of the central region. The base is preferably formed of heavy fabricated or cast components, as is common in the machine tool art, and the frame may include access openings and the like for chip removal as is common. The frame lateral portions 14 are each of a generally rectangular configuration having a length perpendicularly disposed to the length of the central region 12, and the location of the lateral portions with respect to the length of the central region is determined by the operations that are to be performed on the machine tool, and the number of work-holding spindles to be located upon each side of the central region.

Each frame lateral portion 14 serves as the support for a work-holding spindle assembly 16. Basically, each spindle assembly includes a rotating spindle having a workpiece holder located upon the inner end, and a spindle drive is associated with the outer end. Means are provided for axially translating the rotating spindle to feed the spindle into the transfer apparatus and provide the necessary workpiece pickup and movement. It will be appreciated that the specific arrangement of the spindle may take various forms. For instance, the location of the spindle electric drive motor may be above or below the spindle, and likewise, the means for translating the spindle may be located above or below the spindle axis.

Figure 4:
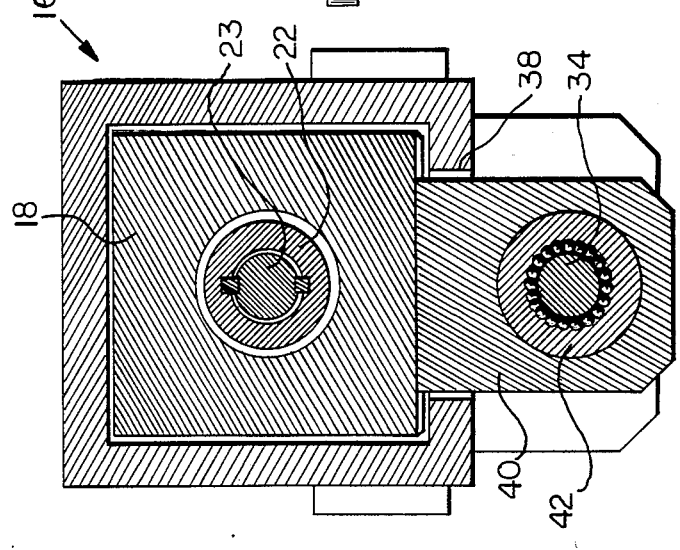
FIG. 4 is an elevational, sectional view as taken along Section IV—IV of FIG. 3.
Figure 3:
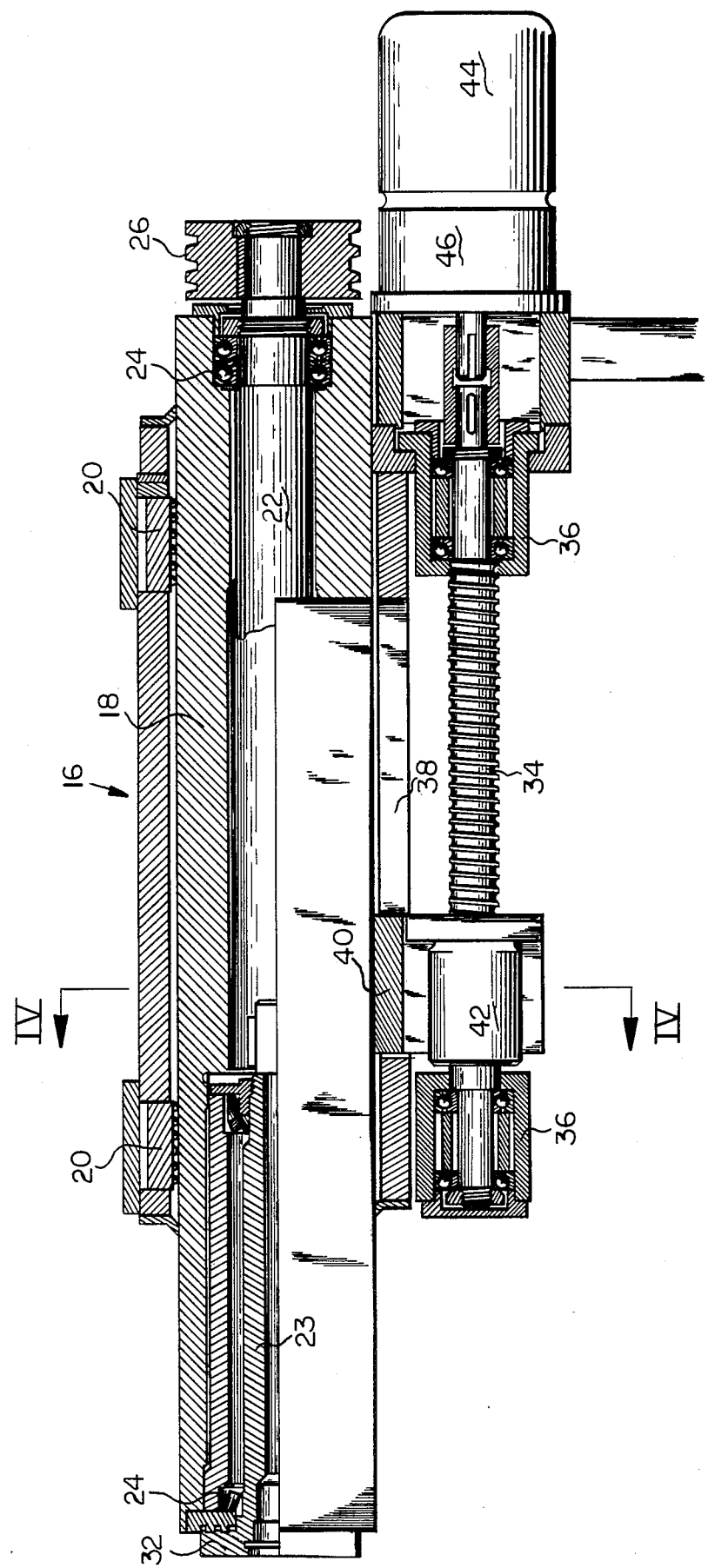
FIG. 3 is an elevational, partially sectional view of a typical spindle assembly utilized with the machine tool of the invention.

FIGS. 3 and 4 illustrate a typical spindle assembly, and for purpose of illustration, the arrangement is one wherein the spindle linear actuator is located below the spindle, and the drive motor for the spindle is located above the spindle axis.

Each frame lateral portion 14, at its upper region, includes a guideway system which supports an elongated head 18. As will be appreciated from FIG. 3, the guideway system includes anti-friction bearings 20 which support the rectangular head 18 for linear displacement along its length. Of course, the head bearing system must very accurately support the head throughout its axial movement, and the linear actuator for axially translating the head is described below.

Internally, the head 18 supports the rotating shaft 22 and its portion 23 constituting the spindle. The spindle 22 is rotatably supported within the head 18 upon axially spaced bearings 24 wherein the spindle accurately rotates within the head and is axially displaceable therewith. The outer end of the spindle includes a drive pulley 26 keyed thereto which is belted to an electric drive motor 28, located within the motor housing 30, FIG. 1. The inner end of the spindle 22 includes work-holding and chucking structure 32 conforming to the workpiece which may be of a conventional configuration and forms no part of the present invention. The work-holding apparatus is automatically operable by electric air or hydraulic actuators, not shown, as is well known in the work-holding art.

Linear displacement of head 18 and advancement of the spindle 22, is achieved by a linear actuator. Such an actuator could be of the hydraulic or electric type, and in the disclosed embodiment comprises an electrically driven threaded shaft. As will be appreciated from FIG. 3, a threaded shaft 34 is rotatably mounted within bearing housings 36 fixed upon the guide structure for the head 18. The shaft 34 is restrained against axial thrust, and the head guide includes a slot 38 thorugh which the nut block 40 extends which is attached to the head 18. The nut block 40 includes a ball-nut 42 containing movable balls engaging the complementary threads or grooves of the threaded shaft 34 wherein a low friction ball-nut and screw arrangement of the known type is produced. Rotation of the shaft 34 is through the variable speed electric motor 44 and a step-down transmission 46 wherein selective rotation of the shaft 34 in either direction is produced and shaft rotation axially displaces the head 18 and spindle 22 during rapid and slow traverse, extended and retracted cycles.

As will be appreciated from FIGS. 1 and 2, a plurality of base lateral portions 14 and spindle assemblies are utilized with a machine tool in accord with the invention, the number being determined by the types of operations that are to be performed by the machine. Usually, spindle assemblies 16 will be located upon opposite sides of the frame central region 12, and such location of the spindles permits the workpiece to be approached from opposite sides permitting machining of the workpiece on both sides or opposite ends.

Movement of the workpiece from one workpiece spindle to another is achieved by transfer apparatus 48 located on the base central region 12. While the transfer mechanism could take a variety of forms, a preferred embodiment is that illustrated wherein the transfer apparatus is elevated with respect to the central region. In this form, the transfer apparatus includes an elongated beam 50, broken for purpose of illustration in FIG. 1, supported above the central region upon guide columns 52 attached to the central region. A plurality of workpiece carriers 54 depend from below the beam 50 and move with the beam. The beam 50 is slidably supported on the columns 52 by bearings 55 and is longitudinally reciprocal by motor and drive means 56 under an automatic control 57. The motor and drive 56 may be hydraulic, air or electrically operated.

Each workpiece carrier 54 is provided with chucking structure 58 which may be of a conventional form designed to conform to the workpiece for grasping the workpiece and holding the same during the transfer cycle. After being worked upon at each spindle location, the workpiece is transferred to an aligned carrier 54 and the beam 50 "shifts" along its length which moves the carrier 54 for alignment with the adjacent spindle assembly 16 thereby transferring the workpiece to the next spindle. The beam and workpiece carriers are returned to alignment after machining with the spindle with which they were previously aligned and are then ready to accept the next workpiece therefrom. Thus, it will be appreciated that it is only necessary for the beam workpiece carriers to shift a distance equal to the separation of adjacent spindle assemblies between cycles.

The "first" workpiece carrier 54 on the beam 50 will receive the workpiece from automatic or manual loading means, not shown, and the "last" workpiece carrier on the beam will transfer the completed workpiece to a position accessible to automatic or manual workpiece transfer apparatus.

As best appreciated from FIGS. 1 and 2, a plurality of tool systems 60 are mounted upon lateral portions 14 adjacent the central region 12 for machining the workpiece while it is held by the adjacent spindle. The tool systems 60 include a variety of conventional turning and boring tools, drills, taps, reamers and the like may be mounted upon the central region 12 upon slides 62 and operated by motors 64 to permit secondary operations at each tool spindle location of the type desired.

In operation, the workpieces within workpiece carriers 54 will be aligned with a spindle assembly 16. Energizing of the motor 44 will axially translate the head 18 toward the aligned carrier 54 permitting the chuck 32 to engage the workpiece, and firmly grasp the workpiece. Of course, at such time the carrier chuck 58 releases the piece to be machined. The motor 44 is then reversed to retract the head 18 and spindle 22, and this retraction is sufficient to align the chucked workpiece with the tool system 60 associated with that particular spindle assembly. Assuming that the workpiece is to be rotated during machining by the associated tool system 60, the associated motor 28 is energized to rotate the spindle 22 and chucked workpiece, and the associated tools 60 are automatically translated upon their slide 62 to produce the desired machining. After machining is completed, the tools 60 are withdrawn from the workpiece, the motor 44 is energized to extend the head 18 and place the workpiece into an aligned workpiece carrier 54 which has been brought into alignment with the spindle assembly after transferring the workpiece thereto initially.

As previously mentioned, the fact that spindle assemblies 16 are mounted upon opposite sides of the central region 12 permits the workpiece to be machined on opposite sides without reversing the workpiece. Thus, workpiece handling is simplified without a sacrifice in accuracy. Minimizing the number of chucking operations of the workpiece contributes to the accuracy of the machining and by locating spindles upon opposite sides of the central region, high accuracies on both sides of the workpiece may be readily achieved.

It is to be understood that with some types of machine operations, such a lateral drilling, boring, broaching, tapping, etc., the workpiece must be held stationary, and in such instances the spindle shaft 22 will not be rotated by motor 28, but will be locked against rotation. The head 18 and spindle 22 will be axially translated toward and from the aligned work carrier 54 to pick up the workpiece and draw it back into position for alignment with the associated tool system 60 and will return the workpiece to a carrier 54 after machining, all without spindle rotation.

Control apparatus, such as housed in control box 57, is used to automatically sequence the operations and functions of the machine tool in accord with the invention, and as conventional control apparatus may be used, the same does not form a part of the present invention. Such control apparatus uses conventional limit switches, position sensors and the like commonly used in the machine tool art to control rapid and slow traverses, tool feeds, retraction cycles, and the like. Likewise, the operation of the movement of the beam 50 and workpiece carriers 54 is fully automated and coordinated with the spindle operation so that sequential movement of the workpiece from spindle to spindle is automatically and efficiently achieved.

A machine tool in accord with the invention is capable of performing a series of machine operations on a workpiece in an automated manner wherein high production and low cost may be achieved in conjunction with superior quality and accuracy. It is appreciated that various modifications to the inventive concepts may be apparent to those skilled in the art without departing from the spirit and scope of the invention.

I claim:

1. A multiple spindle machine tool comprising, in combination an integral base having a longitudinal axis defined by a transfer region and at least two lateral sections extending from said transfer region, a rotating self-loading spindle assembly mounted upon each lateral section each having an axis of rotation and axial direction of operative linear translation transverse to said base axis for axial movement between a workpiece transfer position and a workpiece machining position, releasable workpiece holding means defined on said spindles' assemblies, said lateral sections being spaced from each other along said base axis, workpiece transfer means mounted upon said base transfer region including linearly movable carriers having a direction of movement parallel to said base axis whereby a workpiece may be sequentially transferred along said base axis from alignment with one spindle assembly axis to the other, said carriers being in alignment with a spindle assembly axis at said assembly workpiece transfer position whereby said workpiece holding means is disposed adjacent a carrier when said assembly is in said workpiece transfer position, and workpiece machining means mounted on said lateral sections for machining the workpiece when said assembly is in said workpiece machining position.

2. In a multiple spindle machine tool as in claim 1, said workpiece transfer means comprising an elongated beam mounted upon said base transfer region for reciprocal movement thereon, a plurality of work carriers mounted upon said beam for movement therewith, and reciprocal drive means associated with said beam for reciprocating said beam on said base transfer region for successive alignment of said carriers with spindles adjacently axially spaced with respect to each other.

3. In a multiple spindle machine tool as in claim 1, said spindle assemblies each including an elongated axially displaceable tubular head, a spindle rotatably mounted within said head having a first end and a second end, workpiece holder means mounted upon said spindle first end, spindle drive means mounted upon said second end, and motor means operatively connected to said drive means.

4. In a multiple spindle machine tool as in claim 3, said motor means comprising an electric motor mounted upon said tubular head.

5. In a multiple spindle machine tool as in claim 3, a linear actuator mounted on said base adjacent each spindle assembly, said actuator being operatively connected to said head to produce axial movement of said head and the associated spindle transverse to said base axis, said actuator including a drive motor.

6. In a multiple spindle machine tool as in claim 5, wherein said linear actuator comprises a rotatably supported threaded shaft disposed substantially parallel to the length of the associated tubular head, a nut in mesh with the threads of said shaft affixed to said head, the associated actuator drive motor comprising an electric motor drivingly connected to said threaded shaft.

7. In a multiple spindle machine tool as in claim 1, said base transfer region comprising a central region, a lateral section located on each lateral side of said central region, at least one of said spindle assemblies being mounted upon each of said lateral sides.

8. In a multiple spindle machine tool as in claim 7, a plurality of lateral sections and spindle assemblies being located on at least one lateral side of said central region.

9. In a multiple spindle machine tool as in claim 2, said beam being elevated with respect to said base, said work carriers being suspended from said elevated beam.

* * * * *